UNITED STATES PATENT OFFICE.

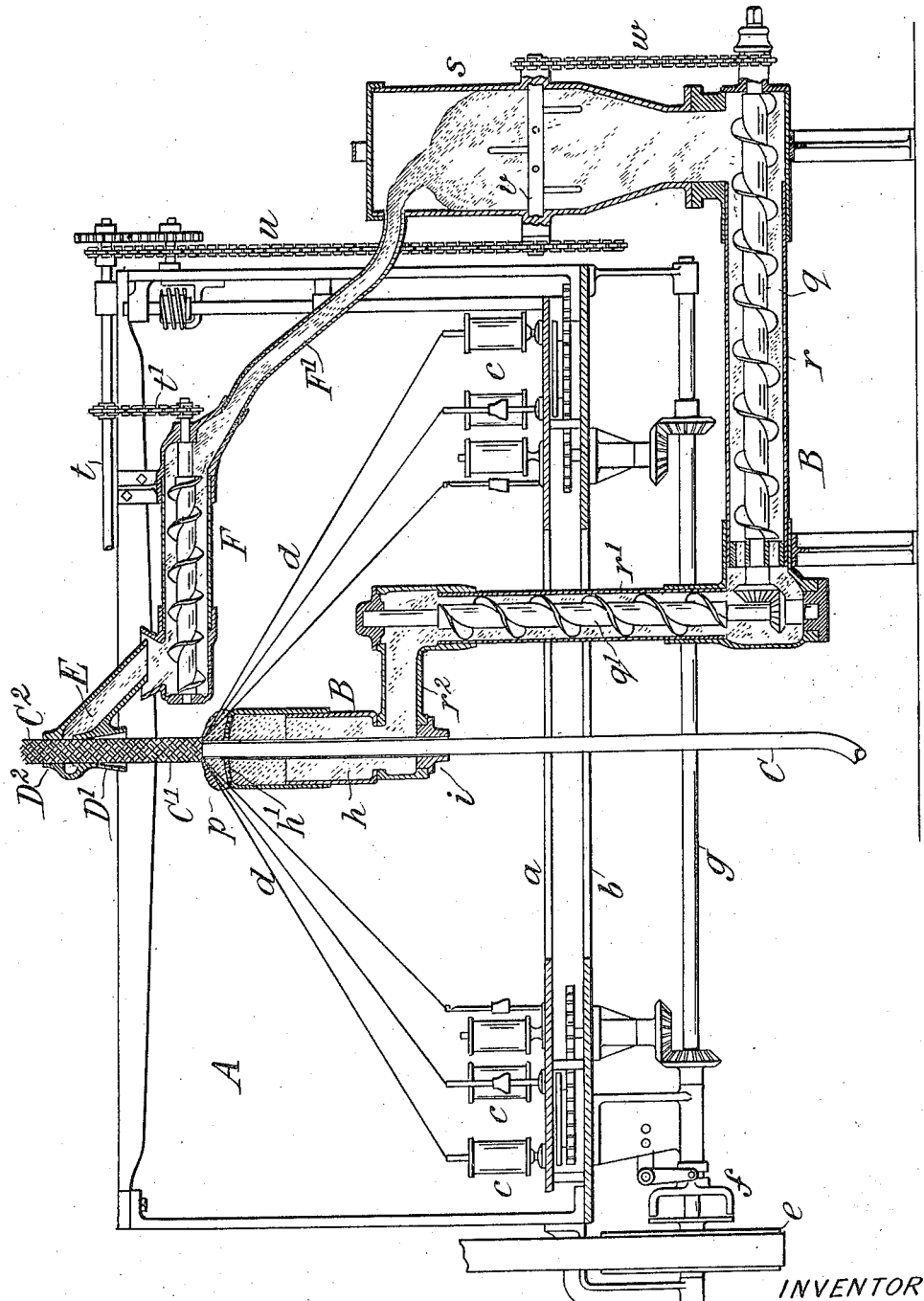

HENRY ZENAS COBB, OF WINCHESTER, MASSACHUSETTS.

MANUFACTURE OF RUBBER HOSE.

1,110,671.

Specification of Letters Patent.  Patented Sept. 15, 1914.

Application filed March 26, 1912.  Serial No. 686,304.

*To all whom it may concern:*

Be it known that I, HENRY ZENAS COBB, a citizen of the United States, residing at Winchester, in the county of Middlesex and State of Massachusetts, have invented certain new and useful Improvements in the Manufacture of Rubber Hose, of which the following is a specification.

This invention relates to an apparatus for applying to a textile envelop or hose, a coating of rubber or analogous composition impregnating such textile web. The composition employed is of dense consistency analogous to that of dough, and is commonly referred to as "friction dough."

According to the present invention the plastic composition or dough is introduced while the fabric is being formed by braiding or analogous operation, in such manner as to maintain a mass of the plastic material which is intersected by the converging yarns which are on their way to form the web. Thus the yarns are compelled to travel through the mass of material and thus become impregnated therewith. The web thus formed carries with it a considerable excess of the plastic material, which is first preferably smeared or rubbed into the interstices of the web, and then the excess is wiped off by passing the tubular web or hose through a close fitting wiper die.

The present invention constitutes an improvement upon that set forth in my Patent No. 1,002,644 granted September 5, 1911. According to that invention the rubber hose or core is passed through a coating device whereby a thin coating of plastic material is formed upon the core, which then is carried some distance through the braiding machine and then receives the braided web, and passes thence through a wiper die which wipes off the excess of coating material, and forms this excess into a mass through which the converging yarns pass. The coating thus has time to partially dry between the point of application and the place where the braiding is performed. By my present invention the plastic material is introduced directly beneath the braiding point, so that when traversed by the yarns it is of the same consistency as when delivered by the forcing means which feeds the material.

Preferably provision is made for wiping off and removing the excess of plastic material, which is returned to the reservoir of such material or is otherwise conducted out of the machine. As to this feature my present apparatus is identical with that set forth in my application No. 651,969 filed September 29, 1911 (on which Patent No. 1,039,697 dated October 1, 1912, has issued).

The accompanying drawing is a vertical midsection through the braiding and coating machine, being a view analogous to Figure 1 in said Patent No. 1,002,644.

Referring to the drawing, the parts identical with those in my aforesaid patent are designated by the same letters.

A designates as a whole the braiding machine, and B the rubber coating device. The braiding machine is of usual construction, comprising upper and lower race plates $a$ $b$ and bobbins $c$ $c$ from which the yarns $d$ $d$ converge to the braiding point. The machine is driven by power applied to a belt pulley $e$, which through a clutch $f$ drives a main shaft $g$ from which the other parts take their motion.

C is the hose or core which is carried up through the center of the machine in the usual manner. It passes through a coating chamber $h$ to which the rubber composition or "friction dough" is fed under suitable pressure in any convenient way. The hose enters through a central die $i$. The top of the coating chamber is formed of a cap $h'$ having a central opening through which the hose passes, and having also preferably surrounding perforations through which the plastic material may exude. This cap $h'$ is located directly beneath the net of converging yarns $d$. Thus the coating chamber $h$ is located much higher than in my previous patent. The coated hose $C'$ passes through a compound die D which is shown as of the same construction as in my said patent No. 1,039,697. It comprises a lower smearing die $D'$ and an upper wiper die $D^2$. The smearing die is so large as to admit the coated hose without wiping off the coating, its function being simply to smooth or rub the coating into the interstices of the fabric. The upper die $D^2$ is smaller and makes a tight fit with the hose, its function being to rub or wipe off the excess of coating and direct such excess down through the chute or spout E, whence it is carried away. The hose $C^2$ emerging from this die thus carries no excess of coating material, and after drying is ready to be vulcanized.

For feeding the rubber composition or dough to the coating chamber $h$, the apparatus shown comprises a screw conveyer $q$ turning in a tubular shell $r$ which at one end draws the dough from the bottom of a hopper $s$ and at the other end discharges it into an upright conveyer comprising a screw $q'$ and casing $r'$ which elevates the material and forces it thence through a lateral branch $r^2$ into the coating chamber $h$. The two conveyer shafts are geared together and the shaft $q$ is rotated by power taken from an upper shaft $t$ of the braider which through a chain $u$ drives a sprocket wheel on a transverse shaft $v$ which passes through the hopper and has stirring arms for agitating the dough in the hopper, and from this shaft another sprocket chain $w$ drives the conveyer shaft $q$. For returning the excess of material from the spout E, another conveyer F is provided of similar construction, driven by a chain $t'$ from the shaft $t$, and from this conveyer a spout F' carries the dough back into the hopper $s$.

In operation, the plastic coating material or dough being forced into the chamber $h$ under suitable pressure, slowly flows out therefrom through the perforations in the cap $h'$ and forms a semi-solid or dough-like mass $p$ above this cap, which mass is thick enough to be intersected by the network of converging yarns $d$. As these yarns are moving constantly around the braiding point, they not only cut their way through this mass and keep it stirred, but they also tend to carry the coating material toward the braiding point, while becoming themselves coated and impregnated therewith. Any tendency of the doughy material to overflow and run down the sides of the chamber $h$ is overcome by this converging movement of the yarns. At the same time the rate of feed is so regulated that the material is not supplied in such excess as would force it to overflow.

The result of the coating and braiding operations is that the rubber composition is caused to permeate the yarns and to penetrate the interstices of the braided fabric or web. As the hose $C^1$ passes up from the braiding point it carries on the surface of its web an irregular excess of coating material. As it enters the smearing die D' this excess is smoothed and rubbed into the interstices of the web. Then as the hose enters the smaller wiping die $D^2$, the superficial material is rubbed off, leaving only that which remains in the interstices of the web. The excess of material overflows from this die and is directed into the spout E, being thence returned to the hopper.

The particular means for forcing the coating material into the chamber $h$ is not important, and the means shown may be substituted by others without affecting my invention.

My invention is susceptible of considerable modification in structural features and arrangement, without affecting its novel and characteristic features which are set forth in the claims which follow.

I claim as my invention:—

1. The process of making hose which consists in braiding yarns into an ascending tubular textile web while introducing a dense plastic material upwardly directly beneath the braiding point, and feeding such material at such rate as to maintain a mass thereof surrounding the braiding point where the yarns pass through such mass on their way to form the web, and finally removing an excess of such material from the surface of the web.

2. The process of making hose which consists in braiding yarns into an ascending tubular textile web while introducing a dense plastic material directly beneath the braiding point, and maintaining a mass of such material through which the yarns pass on their way to form the web, whereby the yarns are impregnated with such material, then smoothing the material carried on the surface of the web, and finally removing the excess of such material from the web.

3. An apparatus for making hose comprising means for braiding an ascending tubular textile web, and means for simultaneously introducing a dense plastic material directly beneath the braiding point, adapted to maintain a mass of such material intersected by the yarns, whereby the yarns pass through such mass on their way to form the web, means for smoothing the material carried on the surface of the web, and means for subsequently removing the excess of such material from the web.

4. An apparatus for making hose comprising means for braiding an ascending tubular textile web, and means for simultaneously introducing a dense plastic material directly beneath the braiding point, comprising a coating chamber through which the core passes, located with its top just beneath the converging yarns, and forcing means for feeding the material into such chamber at such rate as to maintain a mass of material overlying the chamber and intersected by the yarns.

In witness whereof, I have hereunto signed my name in the presence of two subscribing witnesses.

HENRY ZENAS COBB.

Witnesses:
EDWIN L. STICKNEY,
FRANK J. WESTWOOD.